UNITED STATES PATENT OFFICE.

MAURICE JOYCE, OF WASHINGTON, DISTRICT OF COLUMBIA.

IMPROVEMENT IN SEAMLESS MOLDS FOR ELECTROTYPES.

[Specification forming part of Letters Patent No. 161,238, dated March 23, 1875; application filed March 8, 1875.

*To all whom it may concern:*

Be it known that I, MAURICE JOYCE, of Washington, District of Columbia, have invented a new and useful Improvement in Seamless Molds for Electrotypes, for printing and other purposes; and I do hereby declare that the following is a full, clear, and exact description of my invention, and sufficient to enable any person skilled in the art to which it appertains to make and use the same.

To carry out my invention, I take a smooth piece of card-board, bristol-board, leather, or other suitable flexible material, which I cover with a coating of wax, or equivalent material, which equivalent may consist of any other suitable soft substance capable of receiving and retaining impressions from types or other objects.

I usually melt wax in the ordinary manner as prepared by electrotypers. I then immerse a piece of the flexible material of the desired size into the vessel containing the melted wax, by which means a portion of the wax adheres to the same. If I do not succeed in getting a sufficient thickness of wax upon the flexible material in this manner, I lay it upon a flat surface and pour melted wax upon it, and allow the wax to cool. I then scrape the wax down to any desired thickness, accordingly as lines are required in high or low relief. I then black-lead the form or object to be copied, as also the wax coating, and mold by pressure in the usual manner.

I generally press the face of the type, (if a type form is used,) or the highest part of the object to be copied, clear through the wax coating to the flexible base, in order to get a true face upon the finished electrotype.

Designs may be penciled, traced, transferred, or photographed onto the surface of the wax, or an artist sufficiently skilled may work without any copy.

The coating is then cut away for the lines entirely through to the flexible base.

The mold thus produced is on a flexible base, which enables me to give it the desired shape before putting it into the battery.

When I desire to produce a seamless irregular-shaped electrotype, I inclose the flexible mold in a frame or former of the desired shape, and unite the edges by melting the wax till it runs together to form an unbroken surface.

In order to produce a cylindrical electrotype, I inclose the flexible mold in a cylindrical frame or former of the desired size. I then unite the edges of the mold by means of a hot iron or building-tool, which causes the wax to run into and close up the seam between the edges of the mold, thus producing a seamless cylindrical electrotype-mold. I may run in wax, tallow, or other suitable material to build up and unite the edges. The mold or matrix is now made ready for the battery, and an electrotype deposited upon it in any manner usual in the electrotyper's art.

Although I consider card-board, bristol-board, or leather to be the best materials for use as above described, I do not confine myself to their use, as other suitable flexible substances may be employed.

Having thus fully set forth the nature and purport of my invention, what I claim as new, and desire to secure by Letters Patent, is—

1. The process of preparing a seamless mold or matrix for producing seamless cylindrical or irregular-shaped electrotypes by putting a suitable coating upon a flexible base, and molding or cutting in the desired design while the mold is flat, then bending the mold to the desired shape, and uniting the edges by melting or soldering the coating together, substantially as described.

2. A seamless cylindrical or irregular-shaped mold or matrix for producing electrotypes, consisting of a flexible base or support provided with a suitable coating, and having the desired design molded or cut into the same, with the edges of the mold united by soldering or melting the coating together, as set forth.

In testimony whereof I have signed my name to this specification in the presence of two subscribing witnesses.

MAURICE JOYCE.

Witnesses:
J. E. BRIGHT,
W. A. HARTMAN.